US011590921B1

(12) United States Patent
Farooq et al.

(10) Patent No.: US 11,590,921 B1
(45) Date of Patent: Feb. 28, 2023

(54) SLIDABLE POST FOR A VEHICLE

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/746,261

(22) Filed: May 17, 2022

(51) Int. Cl.
| | |
|---|---|
| *B60R 21/231* | (2011.01) |
| *A61G 3/08* | (2006.01) |
| *B60R 22/18* | (2006.01) |
| *B60R 21/0136* | (2006.01) |
| *B60R 21/01* | (2006.01) |

(52) U.S. Cl.
CPC ...... *B60R 21/23138* (2013.01); *A61G 3/0808* (2013.01); *B60R 21/0136* (2013.01); *B60R 22/18* (2013.01); *B60R 2021/01286* (2013.01)

(58) Field of Classification Search
CPC .. B60R 21/23138; B60R 22/18; A61G 3/0808
See application file for complete search history.

(56) References Cited

U.S. PATENT DOCUMENTS

| | | | |
|---|---|---|---|
| 7,963,730 B2 | 6/2011 | Ditch et al. | |
| 9,511,734 B2 | 12/2016 | Weerappuli et al. | |
| 9,725,064 B1 | 8/2017 | Faruque et al. | |
| 9,789,840 B2 | 10/2017 | Farooq et al. | |
| 9,902,362 B2 | 2/2018 | Farooq et al. | |
| 9,956,898 B1 | 5/2018 | Dellock et al. | |
| 9,994,182 B1 * | 6/2018 | Jaradi | B60R 21/214 |
| 10,023,145 B1 | 7/2018 | Rivera et al. | |
| 10,065,592 B2 | 9/2018 | Jaradi et al. | |
| 10,130,529 B2 | 11/2018 | Gale | |
| 10,279,770 B2 | 5/2019 | Faruque et al. | |
| 10,285,880 B1 | 5/2019 | Ghannam et al. | |
| 10,343,642 B2 | 7/2019 | Faruque et al. | |
| 10,688,959 B2 | 6/2020 | Bryant | |
| 10,717,358 B2 | 7/2020 | Patil | |
| 10,807,556 B2 | 10/2020 | Hill et al. | |
| 10,821,930 B2 | 11/2020 | Malapati et al. | |
| 11,083,650 B2 | 8/2021 | Salter et al. | |
| 11,123,241 B2 | 9/2021 | Mori | |
| 11,135,992 B2 | 10/2021 | Faruque et al. | |
| 11,186,246 B2 | 11/2021 | Min | |
| 2009/0309344 A1 | 12/2009 | van Roosmalen et al. | |
| 2020/0017058 A1 | 1/2020 | Jaradi et al. | |
| 2021/0394702 A1 | 12/2021 | Farooq et al. | |

FOREIGN PATENT DOCUMENTS

| | | | |
|---|---|---|---|
| CN | 109941165 A | * | 6/2019 |
| JP | 6747327 B2 | | 8/2020 |
| KR | 1020170031406 A | | 3/2017 |

\* cited by examiner

*Primary Examiner* — Faye M Fleming (74) *Attorney, Agent, or Firm* — Frank A. MacKenzie; Bejin Bieneman PLC (57) ABSTRACT

An assembly for a vehicle includes a vehicle roof and a vehicle floor spaced from the vehicle roof. The assembly includes a post elongated from the vehicle floor to the vehicle roof. The post being slidable along the vehicle roof and the vehicle floor in a vehicle-longitudinal direction. The assembly includes an airbag supported by the post.

20 Claims, 9 Drawing Sheets

SLIDABLE POST FOR A VEHICLE

BACKGROUND

Passenger vehicles are not typically designed to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is required.

Additionally, vehicles are equipped with airbags. In the event of an impact, an inflator activates and provides inflation medium to the airbags, and the airbags pressurize and act as supplemental restraints for occupants during the impact. The airbags are located at various fixed positions in passenger compartments of vehicles. Vehicles may include airbags supported on a dash, side air curtains mounted to the roof rails, side airbags mounted to seats, etc.

DETAILED DESCRIPTION

An assembly includes a vehicle roof and a vehicle floor spaced from the vehicle roof. The assembly includes a post elongated from the vehicle floor to the vehicle roof. The post being slidable along the vehicle roof and the vehicle floor in a vehicle-longitudinal direction. The assembly includes an airbag supported by the post.

The vehicle roof may include a first track and the vehicle floor includes a second track, the post being slidable along the first track and the second track.

The first track and the second track may be elongated along a vehicle-longitudinal axis.

The assembly may include a seatbelt assembly supported by the post, the seatbelt assembly including a clip and a seatbelt webbing.

The vehicle floor may include a third track spaced cross-vehicle from the second track and a seatbelt buckle being slidable along the third track, the clip being engageable with the seatbelt buckle.

The airbag may be inflatable to an inflated position when the clip is engaged with the seatbelt buckle.

The third track may be vehicle-inboard of the first track and the second track.

The vehicle floor may include a track and a seatbelt buckle being slidable along the track, the clip being engageable with the seatbelt buckle.

The track may be vehicle-inboard of the post.

The assembly may include an occupant seating area between the post and the track.

The occupant seating area may be vehicle-inboard of the post.

The seatbelt webbing may extend from the post to the seatbelt buckle and across the occupant seating area when the clip is engaged with the seatbelt buckle.

The assembly may include a second post spaced cross-vehicle from the post, the second post being slidable along the vehicle roof and the vehicle floor in the vehicle-longitudinal direction.

The assembly may include a second airbag supported by the second post.

The assembly may include a computer including a processor and a memory storing instructions executable by the processor to identify a position of a wheelchair along a vehicle-longitudinal axis of a vehicle and slide the post along the vehicle roof and the vehicle floor to a position corresponding to the position of the wheelchair.

The memory may store instructions executable by the processor to inflate the airbag in response to detection of a vehicle impact.

The memory may store instructions executable by the processor to identify the vehicle ignition is activated and slide the post along the vehicle floor and vehicle roof based at least on the identification that the vehicle ignition is activated.

The memory may store instructions executable by the processor to move a buckle slidable along the vehicle floor to a position corresponding to the position of the wheelchair.

With reference to the Figures, wherein like numerals indicate like parts throughout the several views, an assembly 10 for a vehicle 12 includes a vehicle roof 14 and a vehicle floor 16 spaced from the vehicle roof 14. The assembly 10 includes a post 18 elongated from the vehicle floor 16 to the vehicle roof 14. The post 18 being slidable along the vehicle roof 14 and the vehicle floor 16 in a vehicle-longitudinal direction. The assembly 10 includes an airbag 20 supported by the post 18.

The post 18 is slidable in the vehicle-longitudinal direction such that the post 18 may be moved, i.e., slide relative to the vehicle roof 14 and the vehicle floor 16, to a position corresponding to a position of a wheelchair in the vehicle 12. The post 18 may be moved to allow to allow ingress of a passenger and the wheelchair into the vehicle 12. After the occupant and the wheelchair are positioned in the vehicle 12, the post 18 slides to a position corresponding to the position of the wheelchair so that the airbag 20 is positioned to control the kinematics of the occupant in the event the airbag 20 is inflated. In the event of an impact to the vehicle 12, the airbag 20 is inflated from the post 18 to control the kinematics of the occupant of the wheelchair. The airbag 20 uses the post 18 as a reaction surface to control the kinematics of the occupant.

Figure 1:
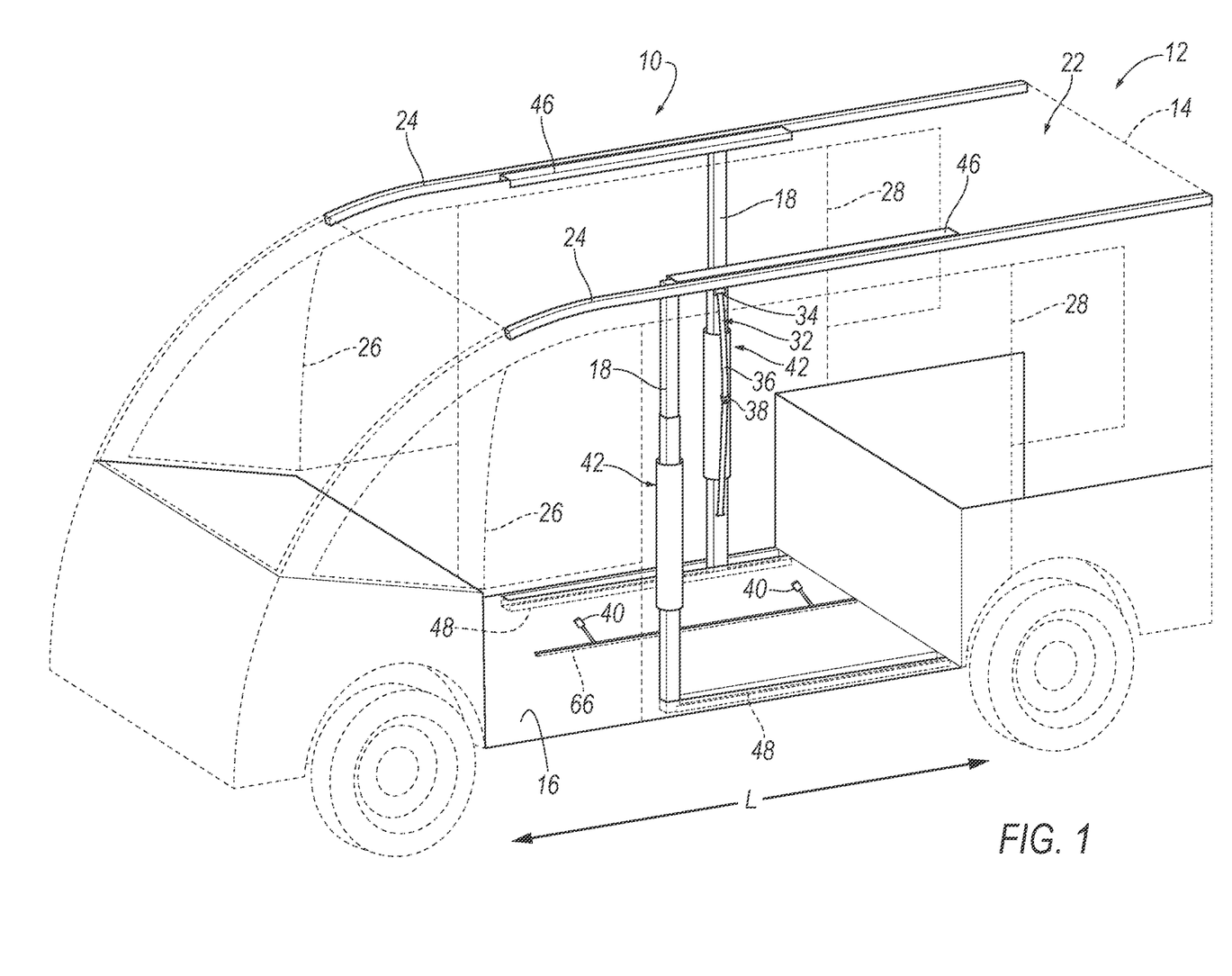
FIG. 1 is a perspective view of a vehicle having posts slidable along a vehicle floor and a vehicle roof.
Figure 2:
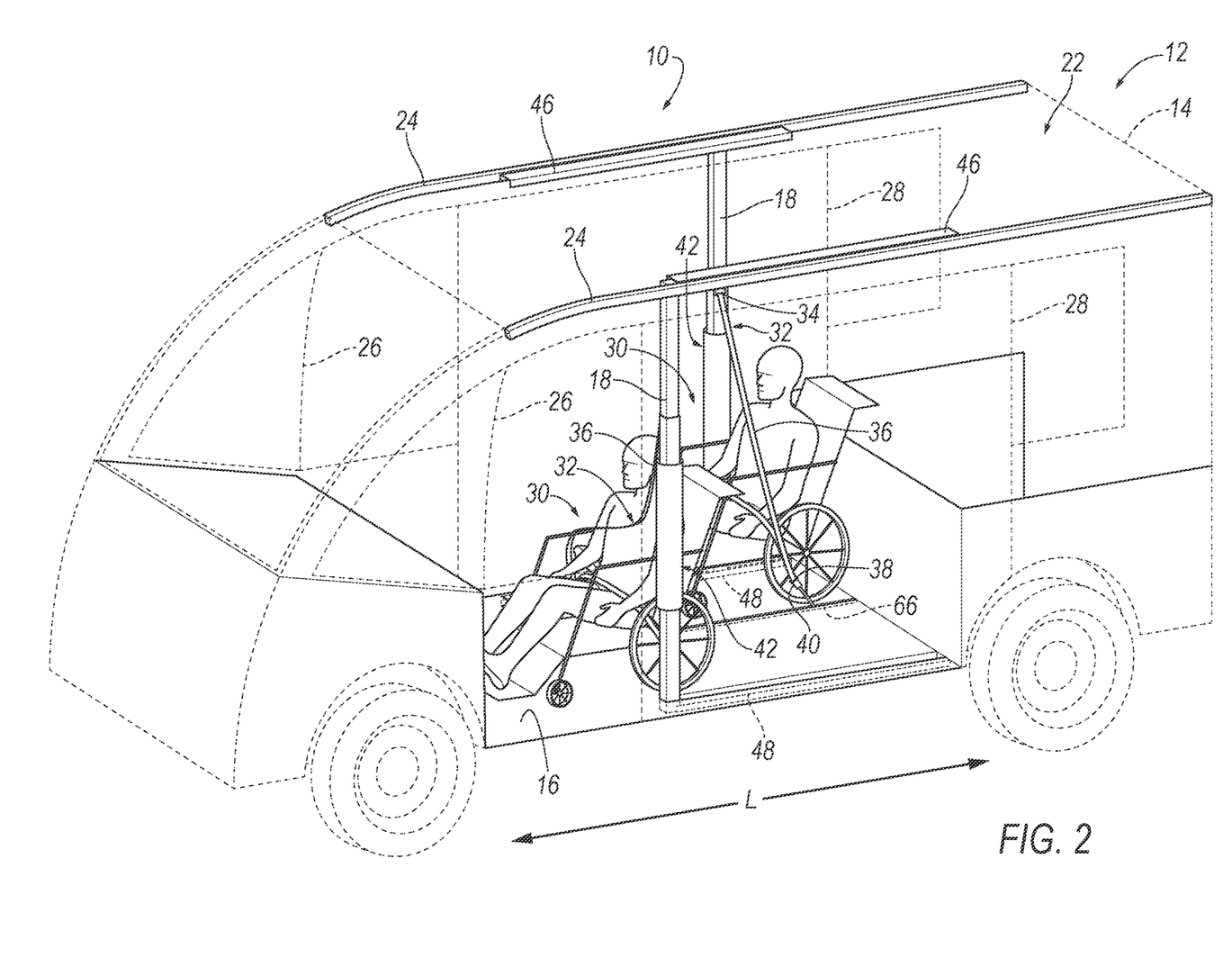
FIG. 2 is a perspective view of the vehicle having the posts slidable adjacent occupants seated in wheelchairs in the vehicle.
Figure 3:
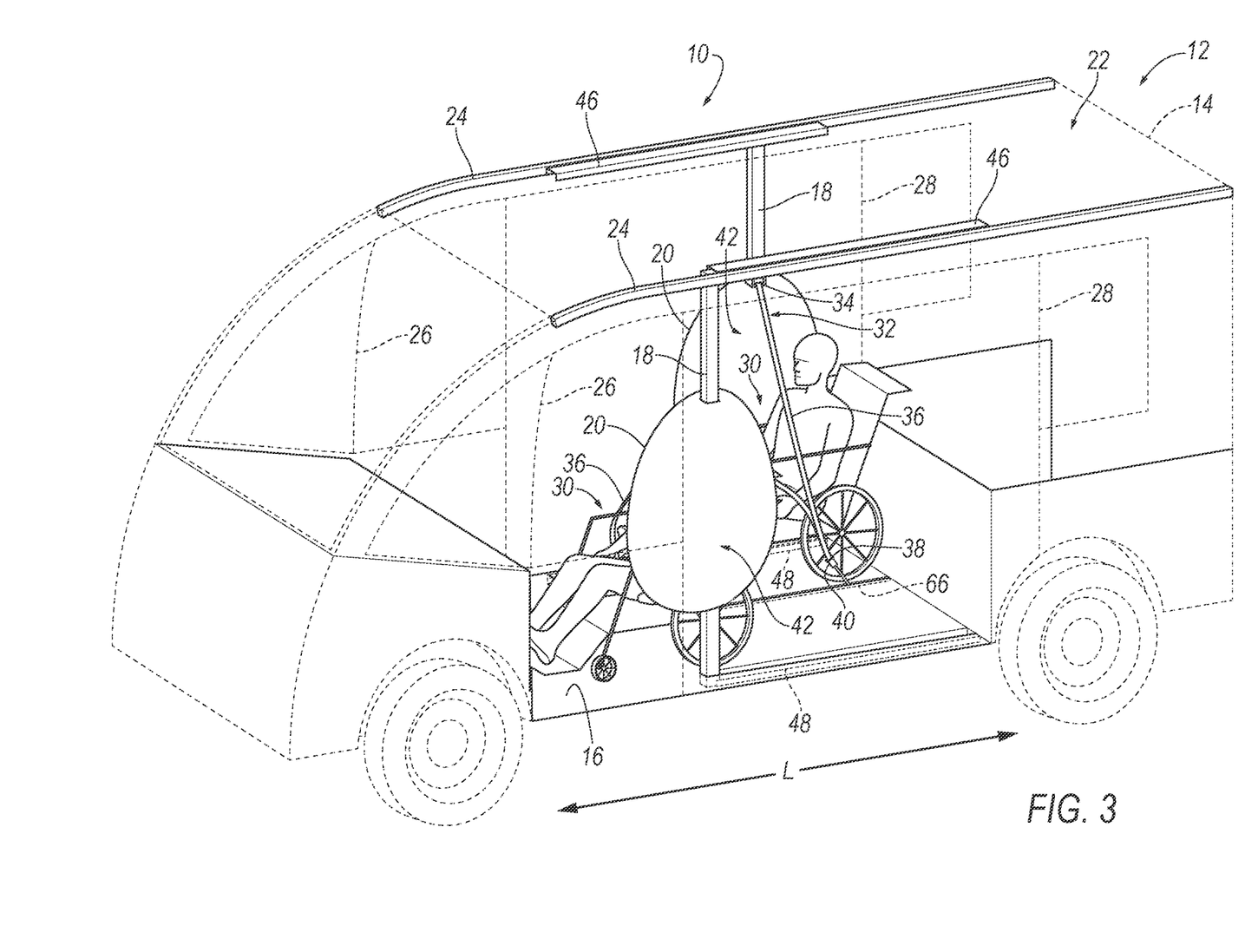
FIG. 3 is a perspective view of the vehicle having airbags supported by the posts, the airbag being in an inflated position.
Figure 4:
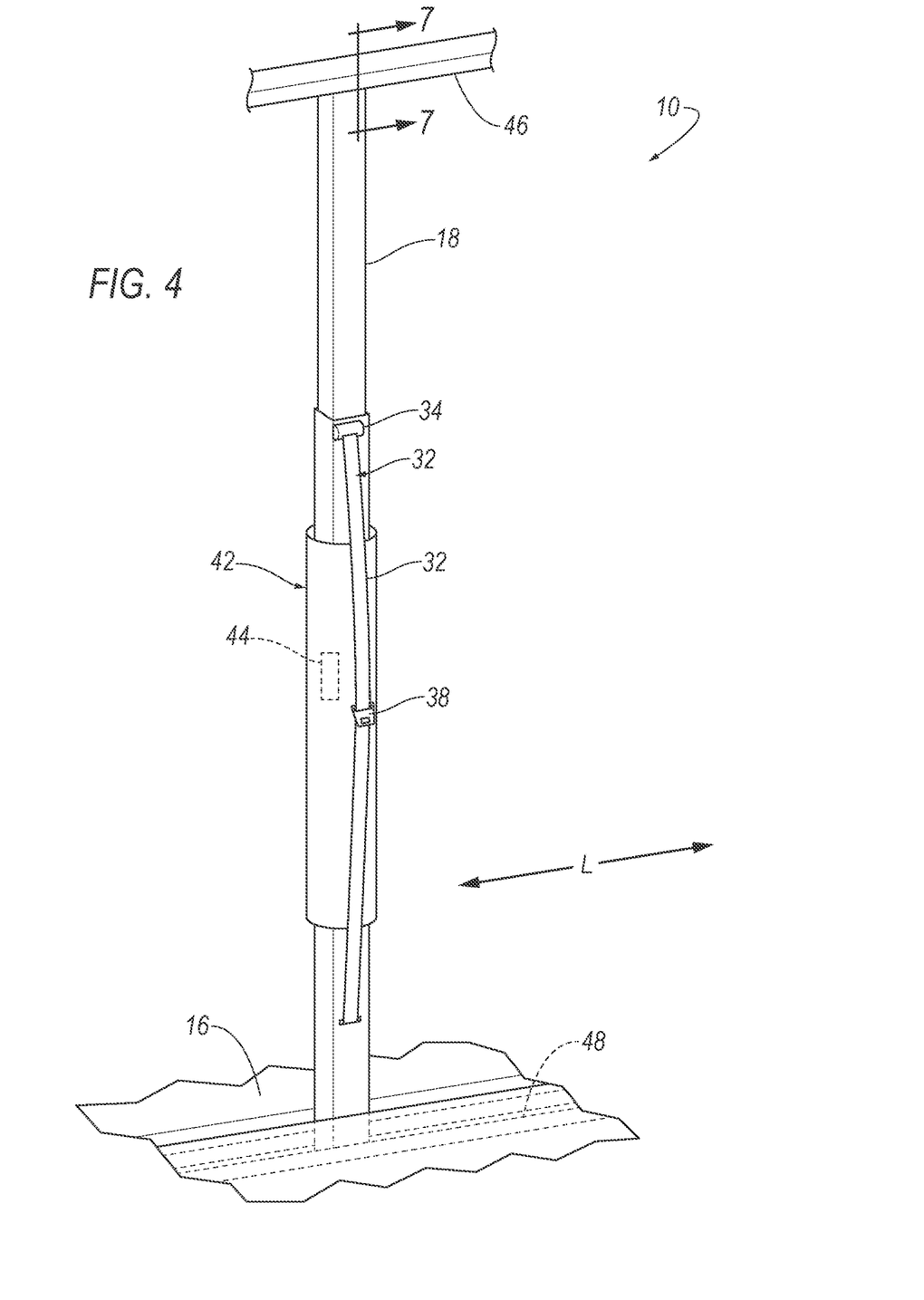
FIG. 4 is a perspective view of one of the posts.

With reference to FIGS. 1-3, the vehicle 12 may be any suitable type of ground vehicle, e.g., a passenger or commercial automobile such as a sedan, a coupe, a truck, a sport utility, a crossover, a van, a minivan, a taxi, a bus, etc.

The vehicle 12 defines a passenger compartment 22 to house occupants, if any, of the vehicle 12. The passenger compartment 22 may extend across the vehicle 12, i.e., from one side to the other side of the vehicle 12. The passenger compartment 22 includes a front end and a rear end with the front end being in front of the rear end during forward movement of the vehicle 12.

The vehicle 12 includes a vehicle body (not numbered). The vehicle body includes body panels partially defining an exterior of the vehicle 12. The body panels may present a class-A surface, e.g., a finished surface exposed to view by a customer and free of unaesthetic blemishes and defects. The body panels include, e.g., a roof, etc.

The vehicle body includes the vehicle roof 14 and the vehicle floor 16. The vehicle body, specifically the vehicle roof 14, includes two roof rails 24. The roof rails 24 are spaced from one another in a cross-vehicle direction. The roof rails 24 each extend longitudinally along the vehicle body, i.e., along a vehicle-longitudinal axis L.

The vehicle body may include pillars 26, 28 spaced from each along the vehicle-longitudinal axis L on both sides of the vehicle body. Specifically, the vehicle body includes a front pillar 26, e.g., an A-pillar, and a rear pillar 28 (which may be referred to as a C-pillar even in examples where there is no B-pillar) spaced vehicle-rearward from the front pillar 26 on each side of the vehicle body. For example, the vehicle body includes a front pillar 26 and a rear pillar 28 on each side of the vehicle 12 with the front pillar 26 being spaced from the rear pillar 28. In other words, the front pillar 26 may be disposed at the front end of the passenger compartment 22. The pillars 26, 28 may extend from the vehicle roof 14 to the vehicle floor 16. The vehicle 12 may include other pillars in addition to the front pillar 26 and the rear pillar 28. For example, as shown in the Figures, the vehicle 12 may include a D-pillar disposed at the rear end of the passenger compartment 22 on each side of the vehicle 12.

With continued reference to FIGS. 1-3, the vehicle body includes rockers (not numbered) extending from the front pillar 26 to the rear pillar 28. Specifically, the vehicle body may include two rockers, one on each side of the vehicle body. The rockers are elongated along the vehicle-longitudinal axis L. The vehicle 12 may include two rockers, i.e., one rocker on either side of the passenger compartment 22. The rockers are spaced from the roof rails 24 below the roof rails 24. The rockers are below the passenger compartment 22. In some examples, the rockers may be connected to the pillars 26, 28 in any suitable way, e.g., welding, adhesive, fasteners, etc. In other words, in such examples, the rockers and the pillars 26, 28 are separate from each other and connected to each other. In other examples, the rockers may be unitary with the pillars 26, 28, i.e., a single, uniform piece of material with no seams, joints, fasteners, or adhesives holding it together. In such an example, the pillars 26, 28 and the rocker may be formed together simultaneously as a single continuous unit, e.g., by molding, forging, casting, stamping, etc. The vehicle floor 16 may be supported by the rockers.

The vehicle roof 14 and the vehicle floor 16 are spaced from each other. Specifically, the vehicle floor 16 is spaced downwardly from the vehicle roof 14. The vehicle roof 14 defines the upper boundary of the passenger compartment 22 and may extend from the front end of the passenger compartment 22 to the rear end of the passenger compartment 22. The vehicle roof 14 may include a roof panel extending from one roof rail 24 to the other roof rail 24. The roof panel may be irremovably fixed to the roof rails 24. In other words, the roof panel is secured to the roof rails 24 in such a way that removal requires destruction such as cutting, e.g., cutting material and/or welded joints, etc. As an example, the roof panel may be attached to both roof rails 24, e.g., by welding, fasteners, etc.

The vehicle floor 16 defines the lower boundary of the passenger compartment 22 and may extend from the front end of the passenger compartment 22 to the rear end of the passenger compartment 22. The vehicle floor 16 may include a floor panel (not numbered) and upholstery on the floor panel, for example, carpet, and may have a class-A surface facing the passenger compartment 22, i.e., a surface specifically manufactured to have a high quality, finished, aesthetic appearance free of blemishes. The roof panel and the floor panel may be, for example, a suitable metal such as steel or aluminum or a suitable polymer such as fiber-reinforced plastic.

The vehicle body may define a door opening (not numbered). Specifically, the vehicle body may include one or more door opening between pillars 26, 28 of the vehicle body. The door opening may be between the front pillar 26 and the rear pillar 28 and between the rocker and the roof rail 24. In other words, the pillars 26, 28 are spaced from each other by the door opening and the roof rail 24 and rocker are spaced from each other by the door opening. The door opening extends uninterrupted from the front pillar 26 to the rear pillar 28. The door opening extends uninterrupted from the rocker to the roof rails 24. The door opening allows for ingress and egress into the passenger compartment 22. The vehicle 12 may include any suitable number of door openings to allow for ingress and egress into the passenger compartment 22. For example, as shown in the Figures, the vehicle 12 may include a door opening on each side of the vehicle 12. In other examples, the vehicle 12 may include multiple door openings on each side of the vehicle 12.

The vehicle 12 includes a plurality of doors (not numbered), e.g., a front door and a rear door on each side of the vehicle body, movable from a closed position to an open position for vehicle 12 occupants to enter and exit a passenger compartment 22. The front door may be supported by the front pillar 26 and the rear door may be supported by the rear pillar 28 in the door opening. In the closed position, the doors are in at least one of the door openings in the vehicle body. The first door and the second door are both in the single door opening in the vehicle body. In the open position, at least one of the door openings in the vehicle body may be exposed.

With continued reference to FIGS. 1-3, the vehicle body may not include a middle pillar between the front pillar 26 and the rear pillar 28, i.e., the vehicle body may not include a middle pillar, e.g., a B-pillar, between the front pillar 26 and the rear pillar 28 from the vehicle floor 16 to the vehicle roof 14. In other words, the vehicle body is B-pillarless. The vehicle body lacking a middle pillar allows for the door opening to extend from the front pillar 26 to the rear pillar 28. The door opening extending from the front pillar 26 to the rear pillar 28 allows occupants easier access to the passenger compartment 22 for ingress and egress.

In the example shown in the Figures, the assembly 10 is operable to be positioned adjacent one or more wheelchairs in the passenger compartment 22. Specifically, the post 18 is between the front pillar 26 and the rear pillar 28. The post 18 is elongated from the vehicle floor 16 to the vehicle roof 14 between the front pillar 26 and the rear pillar 28. The post 18 is movable between the front pillar 26 and the rear pillar 28. Specifically, the post 18 is slidable along the vehicle floor 16 and the vehicle roof 14 in a vehicle-longitudinal direction. Specifically, the post 18 may be slidable along the vehicle-longitudinal axis L relative to the vehicle floor 16 and the vehicle roof 14. In other words, the post 18 may move in a vehicle-forward direction and in a vehicle-rearward direction. The post 18 is slidable along one or more door openings of the vehicle 12, e.g., adjacent the door openings. When the doors are in the closed position, the post 18 is slidable along the doors adjacent the post 18. The post 18 is slidable from a stowed position to a deployed position, i.e., a position corresponding to a position of a wheelchair present in the vehicle 12. The position corresponding to the wheelchair may vary depending on the position in the vehicle 12 along the vehicle-longitudinal axis L. The post 18 may be in the stowed position when the vehicle 12 is parked or not in use and the post 18 may be in the deployed position when the vehicle 12 is going to be moving along a roadway. The stowed position may allow the occupant to enter and exit the vehicle 12 and may allow the wheelchair to be moved into and out of the vehicle 12.

The passenger compartment 22 defines an occupant seating area 30. The occupant seating area 30 is the area occupied by an occupant when properly seated in the vehicle 12. In the example shown in the Figures, for example, the occupant seating area 30 is the area occupied by an occupant seated in a wheelchair in the passenger compartment 22. The occupant seating area 30 is adjacent the post 18. Specifically, the occupant seating area 30 is vehicle-inboard of the post 18. The occupant seating area 30 position may be adjusted depending on the position of the wheelchair in the passenger compartment 22.

With reference to FIGS. 1-4, the assembly 10 may include a seatbelt assembly 32 supported by the post 18. The seatbelt assembly 32 may include a seatbelt retractor 34 and a seatbelt webbing 36 retractably payable from the seatbelt retractor 34. The seatbelt retractor 34 is supported by the post 18. The seatbelt assembly 32 may include an anchor, mounted to the post 18 and coupled to the webbing 36. The seatbelt assembly 32 may include a clip 38 that is engageable with a buckle 40. The buckle 40 may be supported by the vehicle floor 16 vehicle-inboard of the post 18. The occupant seating area 30 is between the post 18 and the buckle 40. The seatbelt webbing 36 extends from the post 18 to the seatbelt buckle 40 when the clip 38 is engaged with the seatbelt buckle 40. Specifically, the seatbelt webbing 36 extends across the occupant seating area 30 when the clip 38 is engaged with the seatbelt buckle 40.

The seatbelt assembly 32 and the post 18 may be disposed adjacent the wheelchair in the vehicle 12 when a wheelchair is present in the vehicle 12. As set forth further below, components of the seatbelt assembly may move relative to the vehicle body, e.g., the vehicle floor, to position the seatbelt assembly to be operable with the post 18 in the deployed position. The seatbelt assembly 32, when fastened, controls the kinematics of the occupant of the wheelchair, e.g., during sudden decelerations of the vehicle 12. The webbing 36 may extend continuously from the seatbelt retractor 34 to the anchor. For example, one end of the webbing 36 feeds into the seatbelt retractor 34, and the other end of the webbing 36 is fixed to the anchor. The anchor may, for example, be fixed to the post 18. Alternatively, the anchor may be fixed to the vehicle body, e.g., the floor, etc. The anchor may be attached to the post 18 in any suitable manner, e.g., with fasteners.

The webbing 36 may be fabric, e.g., woven nylon. The clip 38 slides freely along the webbing 36 and, when engaged with the buckle 40, divides the webbing 36 into a lap band and a shoulder band. The seatbelt assembly 32 may be a three-point harness, meaning that the webbing 36 is attached at three points around the occupant when fastened the anchor, the seatbelt retractor 34, and the buckle 40. The seatbelt assembly 32 may, alternatively, include another arrangement of attachment points.

With reference to FIGS. 1-4, the assembly 10 includes an airbag assembly 42 supported by the post 18. The airbag assembly 42 includes the airbag 20, an inflator 44, and may include a housing (not shown). Specifically, the airbag 20 is supported by the post 18. The vehicle 12 may include any suitable number of airbag assemblies 42. As one example, such as shown in the Figures, each of the posts 18 of the vehicle 12 may include one airbag assembly 42. In examples including more than one airbag assembly 42, the airbag assemblies 42 may be identical or substantially identical to each other.

The airbag 20 is inflatable from an uninflated position to an inflated position when the clip 38 is engaged with the seatbelt buckle 40. In other words, the airbag 20 inflates to the inflated position when an occupant is seated in a wheelchair in the vehicle 12. The airbag 20 inflates between the post 18 and the occupant seating area 30. The airbag 20 may control the kinematics of the occupant in the wheelchair adjacent the post 18. The airbag 20 may use the post 18 as a reaction surface when the airbag 20 is in the inflated position and the airbag 20 is controlling the kinematics of the occupant.

The inflator 44 is fluidly connected to the airbag 20. The inflator 44 expands the airbag 20 with inflation medium, such as a gas, to move the airbag 20 from the uninflated position to the inflated position. The inflator 44 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 20 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIGS. 1-7B, as discussed above, the post 18 is slidable along the vehicle floor 16 and the vehicle roof 14. The vehicle 12 may include tracks 46, 48 that the post 18 is slidable along. Specifically, the vehicle roof 14 includes a first track 46 and the vehicle floor 16 includes a second track 48. The post 18 is slidable along the first track 46 and the second track 48 to the deployed position, i.e., a position corresponding to the position of the wheelchair so that the airbag 20 and the seatbelt assembly 32 (in examples including the seatbelt assembly 32 on the post 18) are positioned to control the kinematics of the occupant of the wheelchair. The adjectives first and second relating to the tracks 46, 48 are used throughout this document as identifiers and, unless explicitly stated otherwise, are not intended to signify importance, order, or quantity. The first track 46 and the second track 48 are both elongated along the vehicle-longitudinal axis L.

Figure 5:
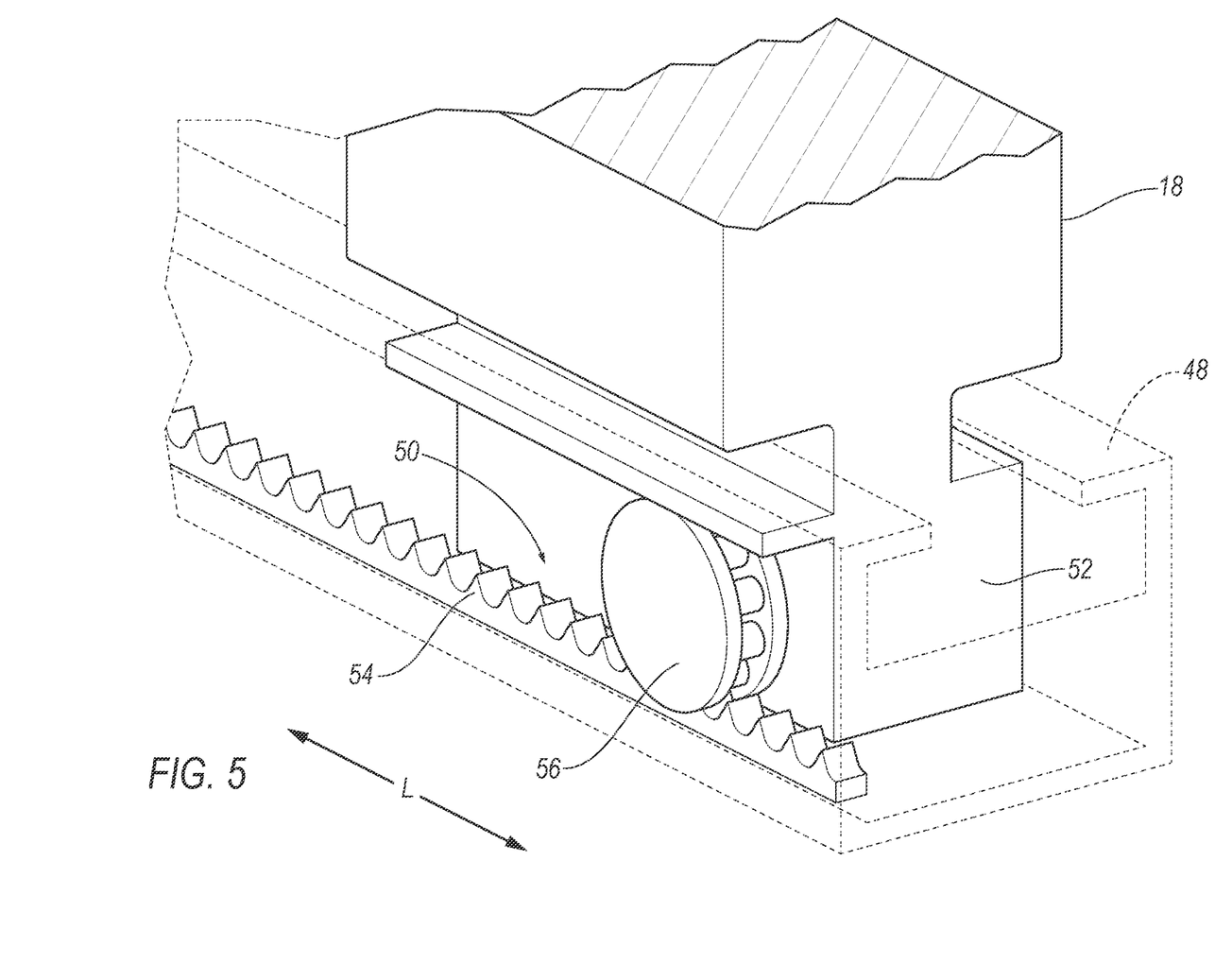
FIG. 5 is a perspective view of a track along which the post slides along the vehicle floor.
Figure 6A:
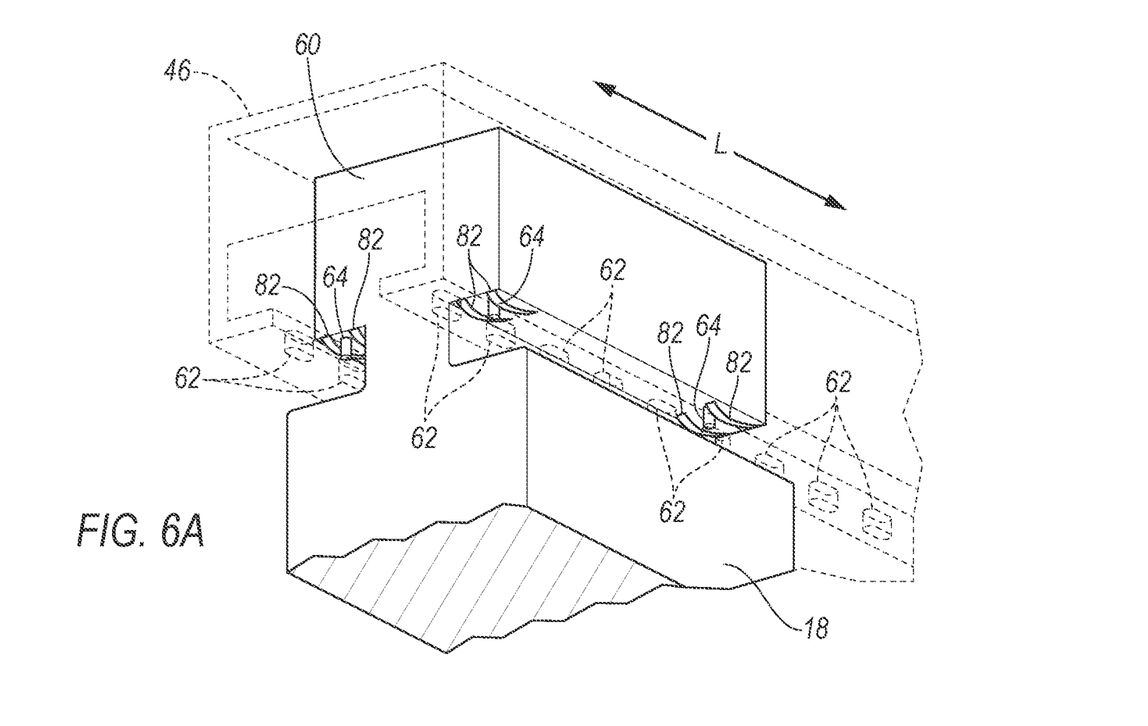
FIG. 6A is a perspective view of a track lockable in the vehicle roof, the track in the unlocked position.
Figure 6B:
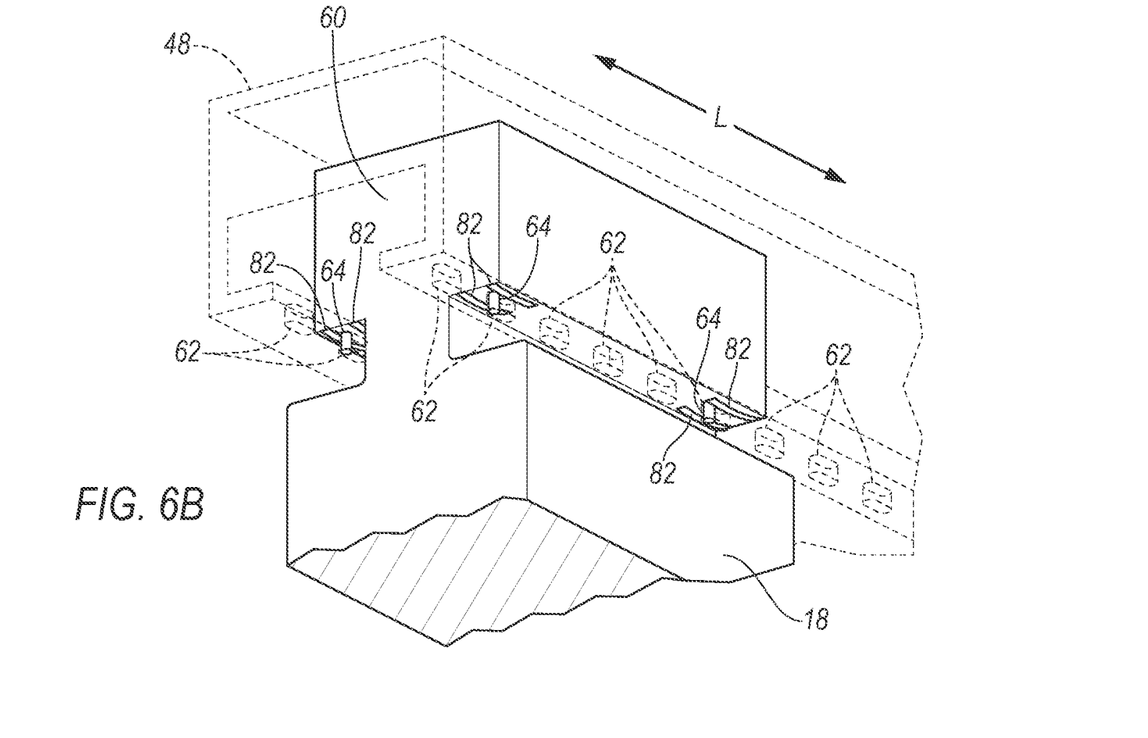
FIG. 6B is a perspective view of the track lockable in the vehicle roof, the track in the locked position.
Figure 7A:
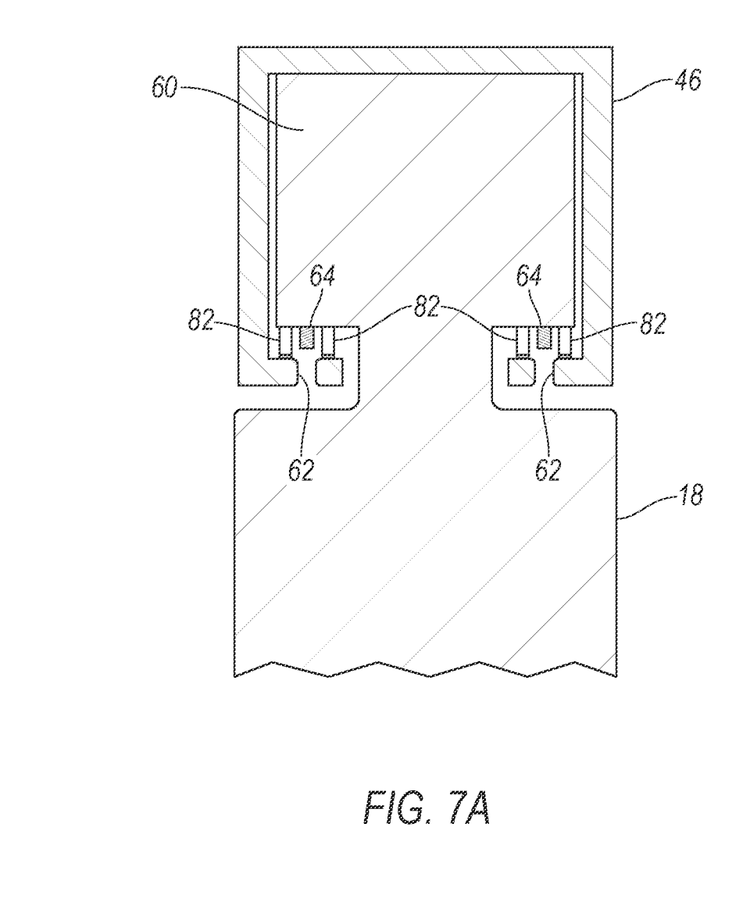
FIG. 7A is a cross-sectional view through line 7 of FIG. 4 of the track lockable in the vehicle roof, the track in the unlocked position.
Figure 7B:
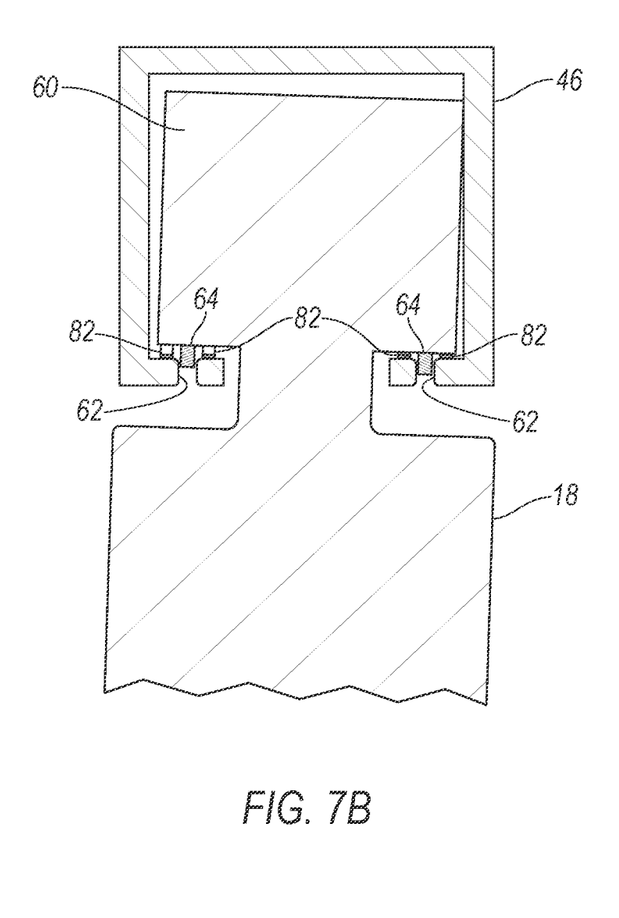
FIG. 7B is a cross-sectional view through line 7 of FIG. 4 of the track lockable in the vehicle roof, the track in the locked position.

With reference to FIG. 5, the assembly 10 may include one or more linear actuators 50 fixed to one or more of the tracks 46, 48 and drivably coupled to the post 18 to slide the post 18 along the tracks 46, 48. The assembly 10 may include a linear actuator 50 couples to a bottom 52 of the post 18 in the second track 48 to slide the post 18 along the vehicle-longitudinal axis L. The linear actuator 50 may include a rack 54 and pinion 56 to move the post 18 along the first track 46 and the second track 48. The linear actuator 50 may include a post motor 58 that rotates the pinion 56 to move along the rack 54, and in turn, moving the post 18 along the second track 48.

With reference to FIGS. 6A-7B, the first track 46, i.e., the first track 46 of the vehicle roof 14, may include a peg 64 and a plurality of slots 62 to lock the post 18 in position in the event of an impact. The post 18 may include a carriage 60 movable along the first track 46. As discussed above, the airbag 20 may use the post 18 as a reaction surface when the airbag 20 is in the inflated position. In such an event, the post 18 may tilt, i.e., be at an angle greater than 90 degrees relative to the first track 46 and vehicle roof 14 cross-vehicle of the post 18 to forces on the post 18 during the impact. When the post 18 tilts cross-vehicle the lock limits movement of the post 18 along the tracks 46, 48. The first track 46 may define the plurality of slots 62 along a bottom surface of the first track 46 and the carriage 60 may include the pegs 64 extending upwardly toward the slots 62 of the first track 46. When the post 18 tilts in the event of an impact, the pegs 64 are received by the slots 62 to limit movement of the carriage 60 and post 18 along the tracks 46, 48. During normal operation of the vehicle 12, i.e., when there is not an impact, the pegs 64 are not received by a slot 62 in the track and the carriage 60 is able to move freely within the tracks 46, 48.

A plurality of springs 82 may be supported by the carriage 60 of the post 18. The springs 82 may be supported at corners of the carriage 60. Specifically, the pegs 64 may each be between two springs 82. The springs 82 may provide a force normal to the first track 46. The springs 82 may slide along the first track 46 during regular operation of the post 18, e.g., when the post 18 is moving to a position corresponding the wheelchair in the vehicle 12, to allow the pegs 64 to maintain clearance with the slots 62 as the carriage 60 slides along the first track 46. In the event of an impact to the vehicle 12, the springs 82 compress from the post 18 being used as a reaction surface for the airbag 20 to allow the pegs 64 to engage the slots 62 along the first track 46.

The vehicle floor 16 may include a third track 66 spaced cross-vehicle from the post 18. Specifically, the third track 66 is spaced cross-vehicle from the first track 46 and the second track 48. The third track 66 is vehicle-inboard of the post 18 and, specifically, the first track 46 and the second track 48. The occupant seating area 30 is between the post 18 and the third track 66. The seatbelt buckle 40 is slidable along the third track 66. The seatbelt buckle 40 may be slidable along the third track 66 to a deployed position, i.e., a position corresponding to the position of the wheelchair in the passenger compartment 22 so that the seatbelt assembly 32 is operable to control the kinematics of the occupant of the wheelchair. When an occupant is in the wheelchair in the vehicle 12, the post 18 moves along the first track 46 and the second track 48 to a position corresponding to the position of the wheelchair and the buckle 40 moves along the third track 66 to a position corresponding to the position of the wheelchair.

The assembly 10 may include a linear actuator (not shown) fixed to the third track 66 and drivably coupled to the seatbelt buckle 40 to slide the seatbelt buckle 40 along the third track 66. Like the linear actuator fixed to the second track 48 shown in FIG. 5, the linear actuator fixed to the third track 66 may include a rack and pinion to move the seatbelt buckle 40 along the third track 66. The linear actuator may include a buckle motor 68 that rotates the pinion to move along the rack, and, in turn, move the buckle 40 along the third track 66.

When the wheelchair is loaded into the vehicle 12, the wheelchair is releasably lockable to the vehicle floor 16 to limit movement of the wheelchair in the passenger compartment 22 when the vehicle 12 is in motion. Specifically, the wheelchair is lockable relative to the vehicle floor 16, the post 18, and the seatbelt assembly 32, e.g., the seatbelt retractor 34. The vehicle 12 may include locks (not shown), e.g., along the vehicle floor 16, to limit the motion of the wheelchair when the vehicle 12 is in use and in motion. In such examples, the locks may be fixed to the vehicle floor 16 and releasably engageable with wheels of the wheelchair to releasably lock the wheelchair to the vehicle floor 16. In such examples, the locks may include retractable pins, hooks, blocks, etc., that releasably engage the wheels of the wheelchair.

The vehicle 12 may include any suitable number of posts 18. Specifically, the assembly 10 may include a second post 18 spaced cross-vehicle from the post 18. In other words, the second post 18 may be on the opposite side of the vehicle 12 from the post 18 such that the second post 18 may be adjacent another occupant in another wheelchair in the vehicle 12. The second post 18 may be constructed the identically to the post 18, i.e., the second post 18 is slidable along the vehicle roof 14 and the vehicle floor 16 in the vehicle-longitudinal direction. The second post 18 includes all the same features as the post 18, e.g., a second assembly 42, i.e., second airbag 20, supported by the second post 18, a second seatbelt assembly 32 supported by the second post 18, additional tracks 46, 48 included in the vehicle roof 14 and vehicle floor 16 for the second post 18 and seatbelt buckle 40 to be slidable along, etc.

Figure 8:
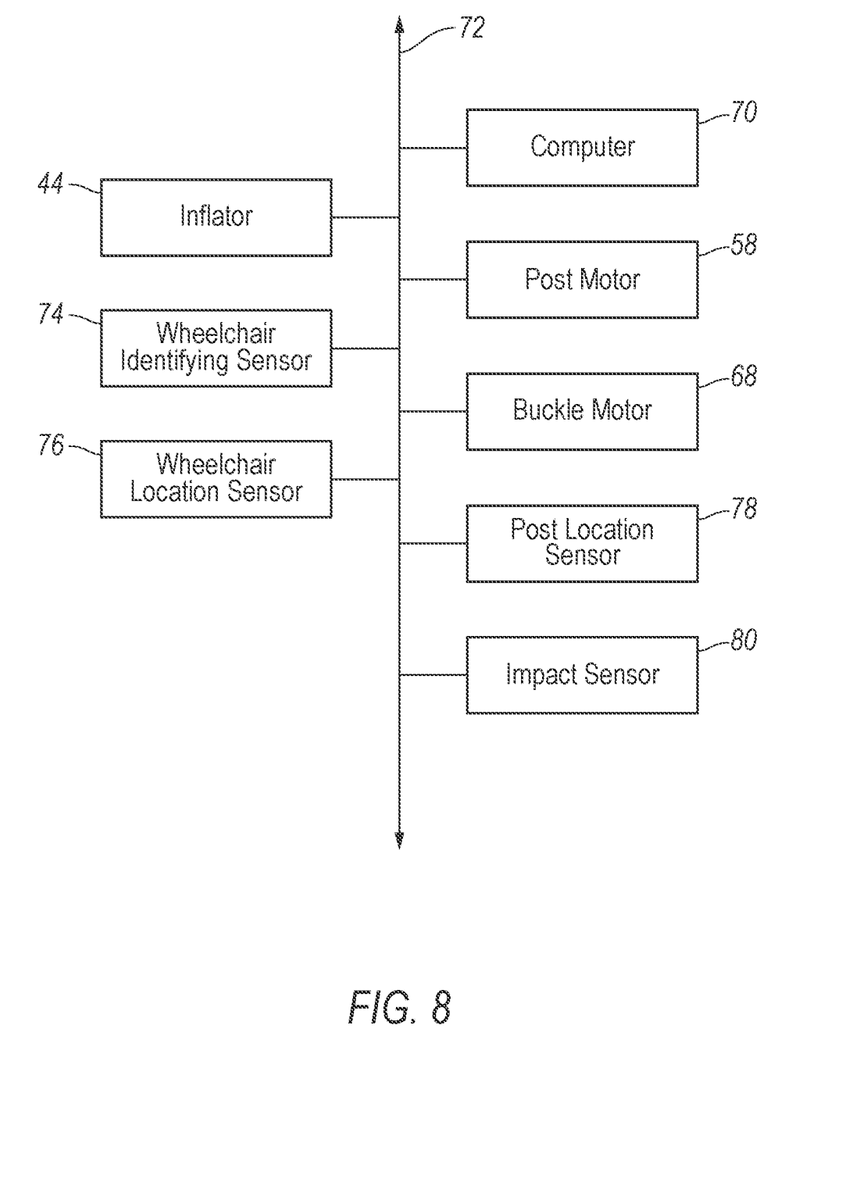
FIG. 8 is a block diagram of a vehicle communication network of the vehicle.

With reference to FIG. 8, the vehicle computer 70 includes a processor and a memory. The computer 70 may be a restraints control module. The memory includes one or more forms of computer readable media, and stores instructions executable by the vehicle computer 70 for performing various operations, including as disclosed herein and including, for example, method 900 shown in FIG. 9 and described below. For example, a vehicle computer 70 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 70 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors. The memory can be a separate device from the computer 70, and the computer 70 can retrieve information stored by the memory via a network in the vehicle 12, e.g., over a CAN bus, a wireless network, etc. Alternatively or additionally, the memory can be part of the computer 70, e.g., as a memory of the computer 70. In some examples, the computer 70 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 70, as opposed to a human operator, is to control such operations. Additionally, the computer 70 may be programmed to determine whether and when a human operator is to control such operations. The computer 70 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

With reference to FIG. 8, the computer 70 is generally arranged for communications on a vehicle communication network 72 that can include a bus in the vehicle 12 such as a controller area network CAN or the like, and/or other wired and/or wireless mechanisms. Alternatively or additionally, in cases where the computer 70 includes a plurality of devices, the vehicle communication network 72 may be used for communications between devices represented as the computer 70 in this disclosure. Further, as mentioned below, various controllers and/or sensors may provide data to the computer 70 via the vehicle communication network 72.

The vehicle 12 may include at least one wheelchair identifying sensor 74 to determine whether a wheelchair is present in the vehicle 12. The wheelchair identifying sensor 74 may be in communication with the vehicle computer 70. The wheelchair identifying sensor 74 may send a signal to the vehicle computer 70 indicating the presence of a wheelchair in the vehicle 12. The vehicle 12 may include any suitable number of wheelchair identifying sensor 74 to determine the presence of any suitable number of wheelchairs in the vehicle 12. In other words, the vehicle 12 may include a number of wheelchair identifying sensors 74 equal to the number of potential occupants which may be present in the vehicle 12. The wheelchair identifying sensor 74 may be, for example, a camera in the passenger compartment 22 to identify the wheelchair.

The vehicle 12 may include wheelchair location sensors 76 to determine the location of the wheelchair, as shown in the Figures. The wheelchair location sensors 76 may be in communication with the vehicle computer 70. The wheelchair location sensors 76 may send a signal to the vehicle computer 70 to indicate the location of the wheelchair along the vehicle-longitudinal axis L. The vehicle 12 may include any suitable number of wheelchair location sensors 76 to determine where along the vehicle-longitudinal axis L any seats or wheelchairs are located. In other words, the vehicle 12 may include a number of wheelchair location sensors 76 equal to the number of potential occupants, in seats or wheelchairs, which may be present in the vehicle 12. The wheelchair location sensors 76 may be any suitable type of sensor. For example, the wheelchair location sensors 76 may be cameras, weight sensors in the vehicle 12, etc.

The vehicle 12 may include post location sensors 78 to determine the location of the post 18 in the vehicle 12. The post location sensors 78 may be communication with the vehicle computer 70. The post location sensors 78 may send a signal to the vehicle computer 70 to indicate the location of the post 18 along the tracks 46, 48, i.e., the vehicle-longitudinal axis L. The vehicle 12 may include any suitable number of post location sensors 78 to determine where long the tracks 46, 48 the posts 18 are positioned. In other words, the vehicle 12 \may include a number of post location sensors 78 equal to the number of posts 18 in the vehicle 12. The posts 18 may move to a position corresponding to the position of the wheelchairs in the vehicle 12 and the post location sensors 78 identify whether the posts 18 are in the proper corresponding locations. The post location sensors 78 may be of any suitable type of sensor. For example, the post location sensors 78 may be cameras, weight sensors, touch sensors, etc. As another example, the post location sensors 78 may be rotary encoders, Hall-effect sensors, etc., on the motors that 58, 68 that use the rotational position of the motor to determine the position of the pinion 56 relative to the rack 54.

The vehicle 12 may include at least one impact sensor 80 for sensing impact of the vehicle 12, and the vehicle computer 70 in communication with the impact sensor 80 and the inflators 44. The computer 70 may activate the inflators 44, e.g., provide an impulse to a pyrotechnic charge of the inflators 44 when the impact sensor 80 senses an impact of the vehicle 12. Alternatively or additionally to sensing impact, the impact sensor 80 may be configured to sense impact prior to impact, i.e., pre-impact sensing. The impact sensor 80 may be in communication with the computer 70. The impact sensor 80 is configured to detect an impact to the vehicle 12. The impact sensor 80 may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 80 may be located at numerous points in or on the vehicle 12.

Figure 9:
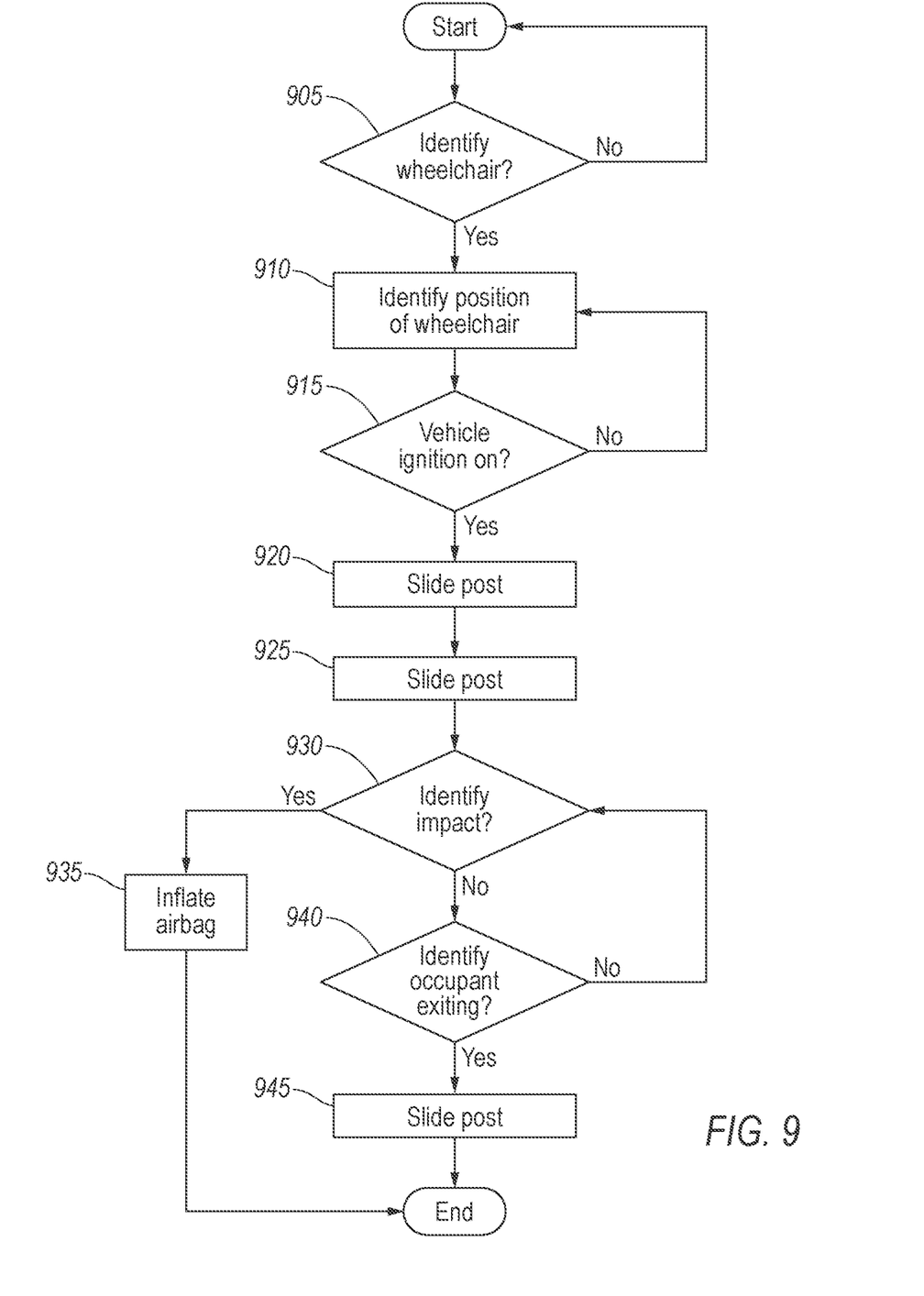
FIG. 9 is a flowchart of a method including instructions executable by a vehicle computer of the vehicle.

The vehicle computer 70 stores instructions to control components of the vehicle 12 according to the method 900 shown in FIG. 9. Specifically, as shown in FIG. 9, the method 900 includes moving the post 18 to a position corresponding to the position of a wheelchair in the vehicle 12. Use of "in response to," "based on," and "upon determining" herein indicates a causal relationship, not merely a temporal relationship.

With reference to decision block 905, the method 900 includes identifying whether a wheelchair is present in the vehicle 12. The wheelchair identifying sensors 74 may notify the vehicle computer 70 that a wheelchair has been loaded into the vehicle 12 and that an occupant will be seated in the wheelchair. If no wheelchair is detected, the method 900 returns to its start. If a wheelchair is detected, the method 900 move to block 910.

With reference to block 910, the method 900 includes identifying a position of the wheelchair along a vehicle-longitudinal axis L of a vehicle 12. The wheelchair location sensor 76 may notify the vehicle computer 70 of the position along the vehicle-longitudinal axis L that the wheelchair is located in the vehicle 12.

With reference to decision block 915, the method may include identifying the vehicle 12 ignition is activated. In such an example, the vehicle computer 70 identifies that the ignition of the vehicle 12 has been activated, i.e., that the propulsion system of the vehicle 12 is operational and ready for movement along a roadway. If the ignition is activated, the method 900 continues to block 920. If the ignition is not activated, the method 900 returns to block 910.

With reference to block 920, based on at least identification that the vehicle 12 ignition is activated, the method 900 includes sliding the post 18 along the vehicle roof 14 and the vehicle floor 16 to the deployed position, i.e., a position corresponding to the position of the wheelchair as described above. For example, in examples including the rack 54 and pinion 56, the post motor 58 rotates the pinion 56 to move the post 18 along the rack 54 fixed to the second track 48. The post location sensor 78 identifies the location of the post along the vehicle-longitudinal axis L, e.g., notifies the vehicle computer 70 of the location of the post 18 until the post 18 has reached the deployed position, i.e., the position corresponding to the location of the wheelchair as described above.

With reference to block 925, in examples in which the post 18 supports components of the seatbelt assembly 32, the method includes sliding the buckle 40 along the vehicle floor 16 to a position corresponding to the position of the wheelchair. The buckle 40 slides along the vehicle-longitudinal axis L to the position corresponding to the position of the wheelchair. Specifically, the buckle motor 68 moves the buckle 40 along the third track 66. The occupant of the wheelchair may then move the seatbelt webbing 36 and the clip 38 and engage the clip 38 with the buckle 40. The seatbelt webbing 36, as described above, extends from the post 18, across the occupant seating area 30, and to the buckle 40 when the clip 38 is engaged with the buckle 40. In examples in which the post 18 supports components of the seatbelt assembly 32, the computer 70 coordinates the movement of the post 18 and the buckle 40 so that the webbing 36, clip 38, and the anchor to the post 18 are positioned in the deployed position for engagement of the clip 38 with the buckle 40 and subsequently control the kinematics of the occupant of the wheelchair in the event of a vehicle impact. In other words, the computer 70 controls the motors 58, 68 to position both the post 18 and the buckle 40 based on the detected position of the wheelchair and based on the relative positions of the post 18 and buckle 40 relative to each other.

With reference to decision block 930, the method 900 includes detecting an impact to the vehicle 12. The one or more of the impact sensors 80 may indicate to the vehicle computer 70 that an impact has occurred to the vehicle 12. If no impact is detected, the method 900 moves to block 940. If the impact is detected, the method moves to block 935.

With reference to block 935, based on the detection of an impact to the vehicle 12 has occurred, the method 900 includes inflating the airbag 20 to the inflated position. The vehicle computer 70 may send a signal or other notification to the inflator 44 of the airbag assembly 42 to inflate the airbag 20 to the inflated position. The airbag 20 may control the kinematics of the occupant of the wheelchair adjacent the post 18. After the airbag 20 inflates, the method 900 ends.

With reference to decision block 940, if no impact is detected to the vehicle 12, the method 900 includes identifying whether an occupant is preparing to exit the vehicle 12. The determination of whether an occupant is preparing to exit the vehicle 12 may be based on the occupant indicating to the vehicle computer 70, e.g., by pressing a button in the vehicle 12, that the occupant will be exiting the vehicle 12. If the vehicle 12 is determined to be in continued use, e.g., in Drive, the method 900 returns to block 930 to detect an impact to the vehicle 12. Decision block 935 may include identifying whether the vehicle 12 has been moved to Park and the occupant will be exiting the vehicle 12. If an occupant is determined to be leaving the vehicle 12, the method moves to block 945.

With reference to block 945, based on identification that the occupant will be exiting the vehicle 12, the post 18 may slide back to the stowed position to allow the occupant to exit the vehicle 12. The post motor 58 may rotate the pinion 56 to move the post 18 along the rack 54 supported by the second track 48. The post 18 sliding to the stowed position allows for space adjacent the doors and in the door opening to allow the occupant to exit the vehicle 12 and allows the wheelchair to be removed from the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle roof and a vehicle floor spaced from the vehicle roof;
a post elongated from the vehicle floor to the vehicle roof, the post being slidable along the vehicle roof and the vehicle floor in a vehicle-longitudinal direction; and
an airbag supported by the post.

2. The assembly of claim 1, wherein the vehicle roof includes a first track and the vehicle floor includes a second track, the post being slidable along the first track and the second track.

3. The assembly of claim 2, wherein the first track and the second track are elongated along a vehicle-longitudinal axis.

4. The assembly of claim 2, further comprising a seatbelt assembly supported by the post, the seatbelt assembly including a clip and a seatbelt webbing.

5. The assembly of claim 4, wherein the vehicle floor includes a third track spaced cross-vehicle from the second track and a seatbelt buckle being slidable along the third track, the clip being engageable with the seatbelt buckle.

6. The assembly of claim 5, wherein the airbag is inflatable to an inflated position when the clip is engaged with the seatbelt buckle.

7. The assembly of claim 5, wherein the third track is vehicle-inboard of the first track and the second track.

8. The assembly of claim 1, further comprising a seatbelt assembly supported by the post, the seatbelt assembly including a clip and a seatbelt webbing.

9. The assembly of claim 8, wherein the vehicle floor includes a track and a seatbelt buckle being slidable along the track, the clip being engageable with the seatbelt buckle.

10. The assembly of claim 9, wherein the airbag is inflatable to an inflated position when the clip is engaged with the seatbelt buckle.

11. The assembly of claim 9, wherein the track is vehicle-inboard of the post.

12. The assembly of claim 9, further comprising an occupant seating area between the post and the track.

13. The assembly of claim 12, wherein the occupant seating area is vehicle-inboard of the post.

14. The assembly of claim 12, wherein the seatbelt webbing extends from the post to the seatbelt buckle and across the occupant seating area when the clip is engaged with the seatbelt buckle.

15. The assembly of claim 1, further comprising a second post spaced cross-vehicle from the post, the second post being slidable along the vehicle roof and the vehicle floor in the vehicle-longitudinal direction.

16. The assembly of claim 15, further comprising a second airbag supported by the second post.

17. The assembly of claim 1, further comprising a computer including a processor and a memory storing instructions executable by the processor to:
   identify a position of a wheelchair along a vehicle-longitudinal axis of a vehicle; and
   slide the post along the vehicle roof and the vehicle floor to a position corresponding to the position of the wheelchair.

18. The assembly of claim 17, wherein the memory stores instructions executable by the processor to inflate the airbag in response to detection of a vehicle impact.

19. The assembly of claim 17, wherein the memory stores instructions executable by the processor to identify a vehicle ignition is activated and slide the post along the vehicle floor and the vehicle roof based at least on the identification that the vehicle ignition is activated.

20. The assembly of claim 17, wherein the memory stores instructions executable by the processor to move a buckle slidable along the vehicle floor to a position corresponding to the position of the wheelchair.

\* \* \* \* \*